United States Patent [19]

Nakamura et al.

[11] 4,345,752
[45] Aug. 24, 1982

[54] SHEET TRANSPORT APPARATUS

[75] Inventors: Kunihiko Nakamura; Hiromi Miyaji, both of Yokohama, Japan

[73] Assignee: Tokyo Shibaura Denki Kabushiki Kaisha, Japan

[21] Appl. No.: 230,887

[22] Filed: Jan. 29, 1981

Related U.S. Application Data

[63] Continuation-in-part of Ser. No. 138,676, Apr. 9, 1980, abandoned.

[30] Foreign Application Priority Data

Apr. 20, 1979 [JP] Japan .................................. 54-48713
Oct. 25, 1979 [JP] Japan .................................. 54-137966

[51] Int. Cl.³ .............................................. B65H 5/08
[52] U.S. Cl. ........................................ 271/12; 271/94; 271/104
[58] Field of Search ................... 271/12, 13, 94–96, 271/104, 112, 121

[56] References Cited

U.S. PATENT DOCUMENTS 3,976,291 8/1976 Bernardi ......................... 271/37 X
4,184,670 1/1980 Rosendahl ........................ 271/94 X Primary Examiner—Richard A. Schacher
Attorney, Agent, or Firm—Finnegan, Henderson, Farabow, Garrett & Dunner

[57] ABSTRACT

A sheet transport apparatus picks up and transports a topmost sheet of a stack of sheets in a one-by-one manner. A suction drum with a cylindrical member rotating in a cyclic manner picks up the leading edge of the topmost sheet by suction force when the cylindrical member is substantially in a momentary stop state. A stationary separation suction head disposed adjacent the stack in the transport direction separates by suction force any sheets underlying the topmost sheet undesirably picked up by the operation of picking the topmost sheet from the stack. A belt conveyor system disposed adjacent the stationary separation suction head in the transport direction gradually grasps the leading edge of the sheet picked-up by the suction drum while the trailing portion of the grasped sheet is also attracted by the suction drum means so that a slight tension is given to the sheet until it is firmly held and transported by the belt conveyor system.

8 Claims, 7 Drawing Figures

SHEET TRANSPORT APPARATUS

This is a continuation-in-part application of U.S. Ser. No. 138,676 filed Apr. 9, 1980 now abandoned.

BACKGROUND OF THE INVENTION

This invention relates to sheet transport apparatus for picking up and conveying successively sheets out of a stack.

Utilization of information reading devices to recognize the information contained in sheet-like materials, such as, for example data cards, stacked one upon another, needs each card to be fed successively to information reading devices in card-by-card manner. One type of prior art apparatus for feeding cards to information reading devices utilizes a continuously rotating suction drum which includes a rotating cylindrical member with an apertured curved surface portion. Provided within the cylindrical member is a stationary suction chamber extending axially along the curved surface and having a curved opening to face the inner surface of the cylindrical member with a certain clearance. The rotating suction drum functions to suck air near to the opening of the suction chamber but outside of the cylindrical member through apertures thereof when the apertured portion of the cylindrical member passes by the opening of the suction chamber.

Such a rotating suction drum is positioned near the leading edge portion of the top-positioned card or sheet of the stack of the sheets with a certain clearance so as to pull up the top-positioned sheet in the direction of movement of the periphery of the suction drum by the sucking operation thereof. Each top-positioned sheet is pulled up at the passing of the apertured curved surface portion of the suction drum. Thus, individual sheets are intended to be pulled up in a precise rhythm in one-by-one manner as the suction drum rotates, and fed to belt conveying systems which convey the sheets in the form of sheet train with a given distance between adjacent sheets.

The information reading device reads the information contained in such transported sheets and then sheets are stacked again in a predetermined position. It is necessary for reading the information from the stack of sheets that the sheets are transported successively in one-by-one manner. It is also usually required that the distance between leading edges of adjacent sheets during transportion is approximately uniform.

The conventional suction drum, however, tends to pull up not only the top-positioned sheet but also additional sheet or sheets lying just thereunder. According to one prior art approach attempting to solve this problem, air blowing nozzles are provided for separating the additional sheet or sheets, if any, from the top-positioned sheet by air flow in the direction reverse to that pulling the top-positioned sheet. It has been found, however, that the nozzles do not provide a sufficient measure for separation. Further, the distance between the leading edges of adjacent sheets during transport hereof tends to vary.

A thin slit capable of passing only a single sheet may be employed for improved separation of the additional sheet or sheets from the top-positioned sheet. This tends to cause a jam or wrinkle of the sheets by choking of sheets within the slit. Furthermore, it is very difficult to adjust precisely the width of the slit in a practical operation.

Another prior art approach to a single sheet feed relates to a bottom feed type apparatus wherein the bottom sheet of the stack is meant to be attached by a similar first suction drum positioned under a plane defined by such sheet and ahead of the leading edge of the stack in the transport direction. Several sheets in the bottom portion of the stack are advanced in the transport direction by a second suction drum positioned under the stack of sheets at their trailing edge portion so that the bottom-positioned sheet of the thus advanced several sheets may be directly attracted by the first suction drum. Any undesired additional sheet is pushed back by still a third suction drum having peripheral movement reverse to the transport direction for retaining the additional sheet. The third suction drum generally faces the first suction drum with a clearance for passage of sheets but is positioned slightly ahead of the first suction drum in the transport direction.

The retaining suction drum includes a rotating cylindrical member which has multiple rows of apertures along the entire curved surface, and a suction chamber with an opening cooperable with a single row of the apertures facing the additional sheet, if any, along the axis of the cylindrical member. Thus, one of the apertures in the suction chamber functions to suck air while the rows of apertures in the drum generally move in the direction reverse to the direction of the sheet transport whereby the additional sheet, if any, is forced to be retained slightly or pushed back. It is noted that the push back force is given to the additional sheet at the rear end portion thereof with respect to the push back direction. There is further provided a vibration means to give vibration to the stack of the sheets to assist forward movement of the attracted sheet being fed as well as backward movement of pushed back sheet. Such apparatus is disclosed in German Patent Disclosure (Offenlegungsschrift) No. 24 54 082.

This approach, however, has disadvantages in that the pushing back operation tends to cause jamming and wrinkling of the sheets. Since only a single row of apertures of the third suction drum is effective to separate any additional sheet from the sheet being fed, and further such single row of apertures is moving generally backwardly, it is very difficult to adjust the timing of the system for obtaining expected or intended operation in practice. The numerous parts of the system and the coordination of their timing becomes very complicated in manufacture and use.

SUMMARY OF THE INVENTION

Accordingly, one object of this invention is to improve apparatus for feeding sheets from a stack to a transport so as to stabilize the distance between the leading edges of successive sheets being transported.

Another object of this invention is to reduce the probability of occurrence of wrinkles or jams in the sheets and the occurrence of undesirable vibration in the sheets.

According to one aspect of this invention, a sheet transport apparatus comprises: means for maintaining a stack of sheets with the topmost sheet of the stack at a predetermined position; suction drum means supported adjacent the topmost sheet of said stack with a clearance therebetween at the leading edge portion of the topmost sheet in the transport direction for picking up the topmost sheet in the transport direction; means for conveying the picked up topmost sheet away from the suction drum means; and stationary separation means disposed adjacent to the stack in the transport direction, the stationary separation suction means including a surface substantially coplanar with the topmost sheet and having a plurality of rows of apertures through which air is sucked for separating any sheet or sheets underlying the topmost sheet undesirably picked up by the operation of picking the topmost sheet from the stack.

BRIEF DESCRIPTION OF THE DRAWINGS

Throughout these Figures, identical parts are indicated by the same reference numerals.

DETAILED DESCRIPTION OF THE PREFERRED EMBODIMENT

Figure 1:
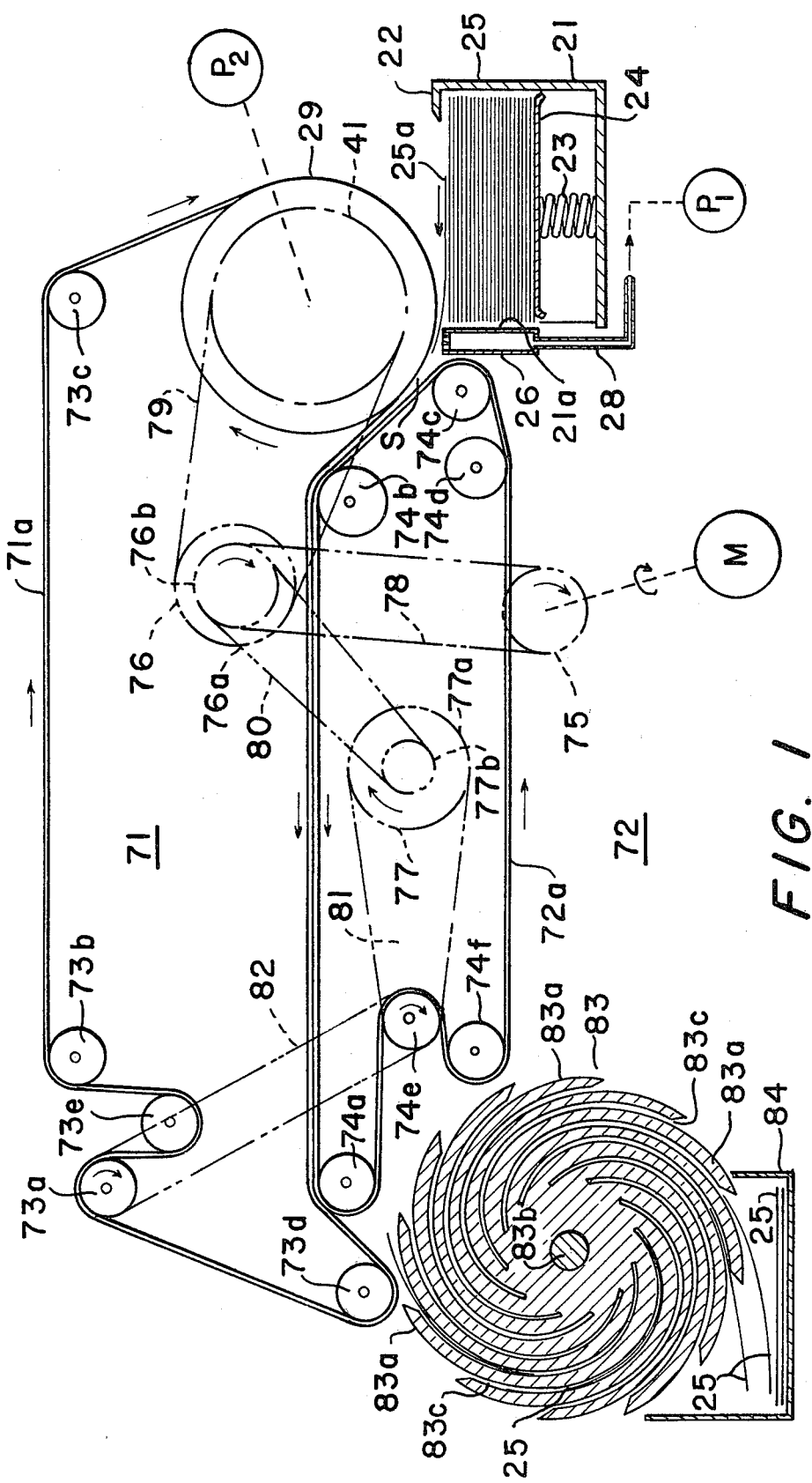
FIG. 1 shows a schematic side view, partly in cross section, of the sheet feed and transport apparatus of the invention.

Referring to FIG. 1, reference numeral 21 indicates a case for containing sheet-like materials such as sheets of paper or cards to be transported in the direction as indicated by the arrows in sheet-by-sheet manner.

The case 21 is generally box-like in shape and sufficiently open at the top to allow the sheets to be removed in a substantially horizontal plane. A stop bar member 22, which may be integral with the case 21, extends outwardly over a portion of the top of the case for defining the position of the top of the stack. Preferably the bar 22 overlies the trailing edges of the sheets as to their direction of movement. Provided within the case 21 is a lift plate 24 which is spring-biased upwardly by a spring 23. The sheet-like materials, such as, for example, data cards, are stacked one upon another on the plate 24 to form a stack 25. The stack 25 is positioned in such a manner that the uppermost or top-positioned card 25a of the stack 25 is kept at a predetermined position by cooperation of engagement between stop bar member 22 and stack 25, and biasing force of spring 23.

The forward movement of the sheets 25 within the casing 21 is limited by abutment against a vertical surface 21a. In the preferred embodiment the surface 21a forms a portion of the wall of a vertically aligned separation suction device 26, the horizontal head of the suction device being positioned coplanar with or slightly above the plane of the topmost sheet 25a in the stack 25.

It is apparent that if desired, the vertical surface 21a could be formed by an integral portion of the casing 21 and the suction device 26 could adjoin the integral wall of the casing.

Figure 6:
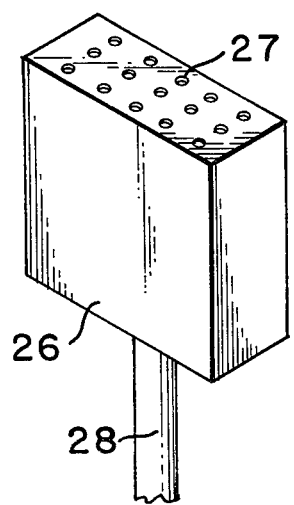
FIG. 6 shows a schematic perspective view of the separation suction device of the embodiment of FIG. 1.

As shown in FIG. 6, the suction device 26 is of box-like shape to form a chamber therein, the head of the device having apertures arranged in rows and columns. In the illustrated embodiment, there are 15 apertures in a matrix of 3 rows and 5 columns. The chamber of the suction device 26 is communicated with an evacuation device $P_1$ through a conduit 28. The purpose of the suction device 26 will be explained hereinafter.

Figure 2:
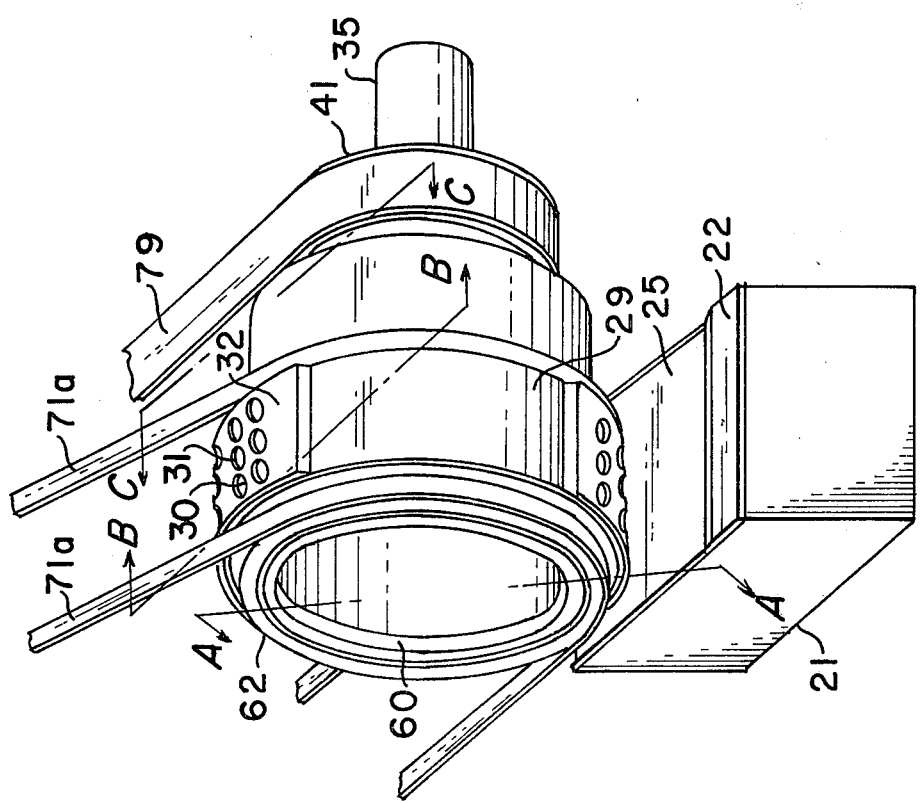
FIG. 2 shows a perspective view of the suction drum of the apparatus of FIG. 1.

Referring again to FIG. 1, a suction drum, generally indicated at 29, is positioned above the case 21 such that the axis of the drum is parallel to, and slightly to the rear of, the projection of the vertical surface 21a. The curved surface of the drum 29 is substantially tangent to a plane parallel to the topmost sheet 25a but slightly separated therefrom to permit movement of the leading edge of the topmost sheet upward to the curved surface of the suction drum. This drum 29 has an axial width somewhat shorter than the width of the sheets 25, such as data cards, as can be seen from FIG. 2, whereby both side edges of the sheets extend beyond the width of the drum, as the sheets are advanced in their lengthwise direction.

Figure 3:
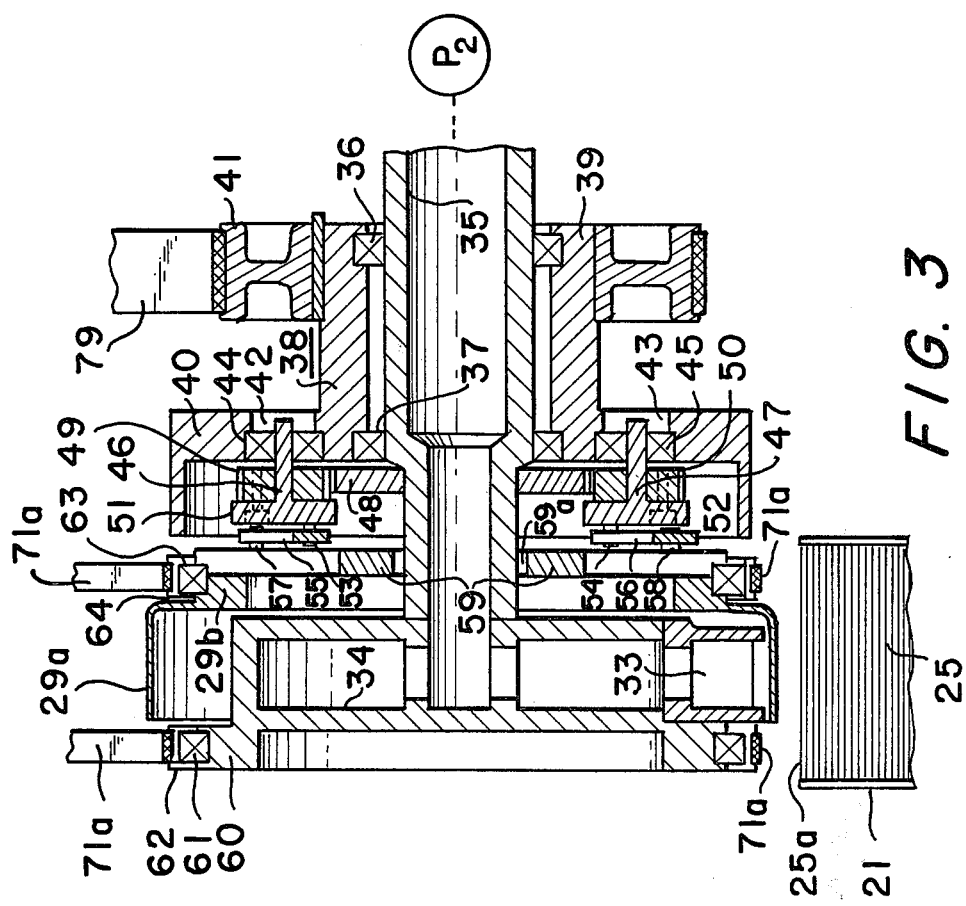
FIG. 3 shows a cross-sectional view of the suction drum of FIG. 2, taken along line A—A thereof, wherein the rotational position of the suction drum is advanced from that shown in FIG. 2.
Figure 4:
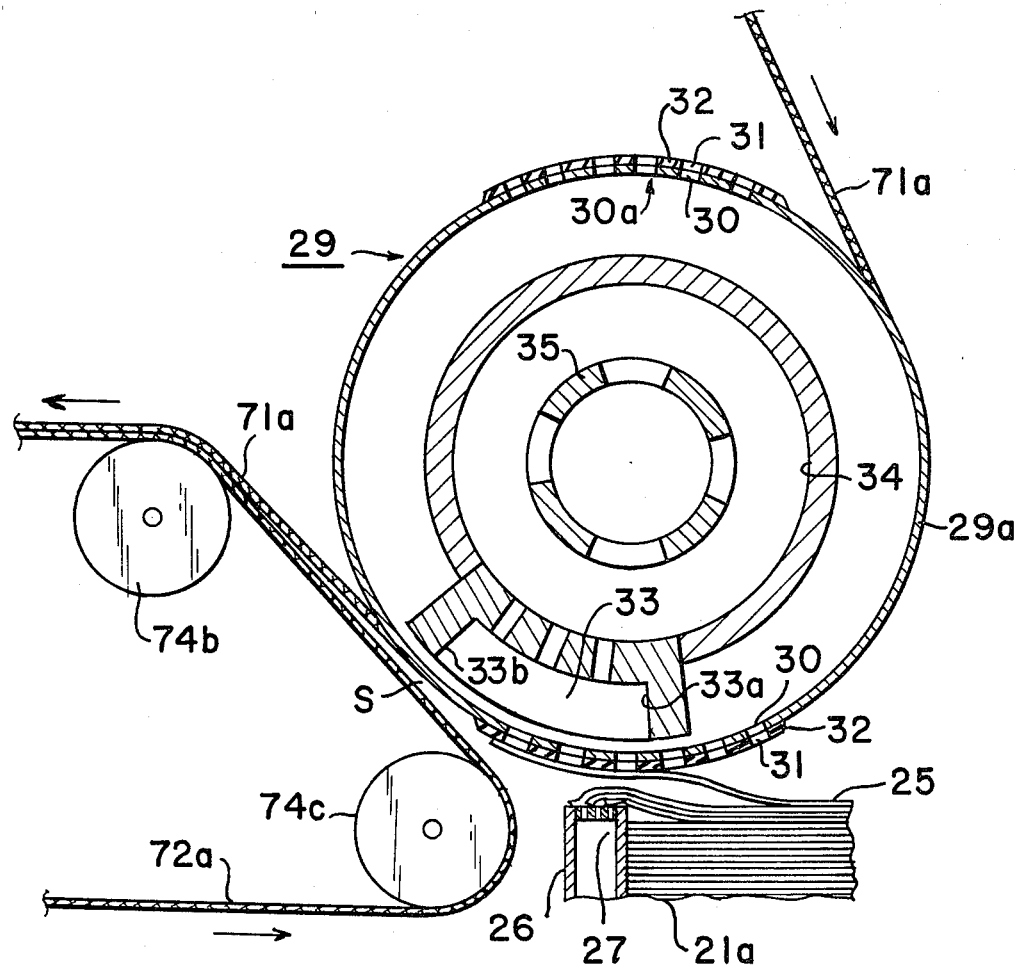
FIG. 4 shows a schematic cross-sectional view of the suction drum of FIG. 2, taken along line B—B thereof.

Referring to FIGS. 3 and 4, suction drum 29 has a cylindrical member 29a with a flange portion 29b extending radially inwardly from one peripheral edge of its curved surface. The cylindrical member 29a includes an apertured curved surface. In more detail, the cylindrical member 29a has a plurality of apertures 30 disposed regularly about its curved surface in two diametrically opposite peripheral zones 30a and extending circumferentially by a predetermined distance. Mounted on such peripheral zones 30a are coverings 32 of sheet-like materials of relatively large coefficient of friction such as, for example, rubber sheets, and the coverings 32 having apertures 31, each corresponding to respective apertures 30 of the cylindrical member 29a. The cylindrical member 29a has, for example, a diameter of 127 mm under the conditions that the length of the cards in the transport direction is within a range from 50 mm to 200 mm and that the distance between leading edges of the adjacent cards during transportation is 300 mm.

Provided within the cylindrical member 29a is a stationary suction chamber, generally indicated at 33, to provide suction operation in cooperation with apertures 30 of the member 29a. A hollow stationary drum 34 (FIGS. 3 and 4) is provided coaxially within the cylindrical member 29a, and is secured coaxially to a bored and apertured stationary axis 35. The hollow portion of the drum 34 forms a chamber for communication between suction chamber 33 and the bore of the stationary axis 35, which, in turn, is connected to an evacuation pump $P_2$.

The suction chamber 33 is formed in the annular area between the drum 34 and the inner curved surface of the cylindrical member 29a by two longitudinal ribs 33a, 33b on the outer surface of the drum 34 extending radially outwardly to terminate near the inner surface of the cylindrical member 29a.

The drum 34 is apertured between the ribs 33a, 33b providing suction in the chamber 33 from the bored axis 35 through the space between the axis and the drum 34. The suction chamber 33 thus substantially extends across the width of the cylindrical member 29a.

The ribs 33a, 33b may be integral with the drum 34, or, if desired, the ribs and the arcuate wall interconnecting the ribs may be fabricated as a separate member and the arcuate wall portion inserted into an opening in the wall of the drum 34 as shown in FIG. 4.

The circumferential distance between the opposing outer ends of the ribs 33a, 33b is slightly less than the circumferential length of the zone 30a of the apertured areas in the cylindrical member 29a.

The stationary suction chamber 33 is positioned such that the plane of the inner surface of the trailing rib 33a, in the direction of rotation of the cylindrical member 29a, is preferably about 3 to 8 mm to the rear of the plane of the surface 21a. In other words, the major portion of the circumferential length of the chamber 33 extends beyond the leading edges of the sheets in the stack 25 in the direction of movement of the sheets in transport.

Whenever the apertured curved surface of cylindrical member 29a overlaps the chamber 33 upon rotation of the cylindrical member, air near its apertured curved surface is sucked through the apertures 30 and 31 into the chamber 33. This suction operation functions to attract the data card 25a. Accordingly, the open side of the chamber 33 between the ribs 33a, 33b defines a potential suction zone. The potential suction zone has substantially the same width as the axial length of the cylindrical member 29a, and extends circumferentially between the ribs 33a, 33b.

The driving mechanism of cylindrical member 29a will now be explained. As shown in FIG. 3, a sleeve-like planetary gear supporting member, generally indicated at 38, is rotatably mounted on bored stationary axis 35 by journals 36 and 37. The member 38 comprises a bored axis portion 39 mounted on the journals 36, 37 and a disk-like portion 40 extending radially from one end of the axis portion 39. A pulley 41 is secured to axis portion 39 at its end opposite to disk-like portion 40, for giving a continuous rotation to planetary gear support member 38 by a belt 79.

A stationary solar gear 48 (see also FIG. 5) is coaxially secured to bored axis 35 adjacent the end of the axis portion 39 having the disk-like portion 40 attached thereto. Solar gear 48 meshes with planetary gears 49 and 50 rotatably supported by disk-like portion 40 of planetary gear supporting member 38. The diameter of solar gear 48 is twice that of planetary gears 49, 50.

Disk-like portion 40 has a pair of recesses 42 and 43 at diametrically symmetrical positions with respect to the axis of bored stationary shaft 35, for containing journals 44 and 45, respectively, which rotatably support pins 46 and 47, respectively. Pins 46 and 47 have integral disk-like terminal head portions 51 and 52, respectively. Planetary gears 49 and 50 are secured on pins 46 and 47, within and in contact with, disk-like head portions 51 and 52 of pins 46 and 47, respectively. Thus, planetary gears 49 and 50, together with disk-like head portions 51 and 52 are given rotation by rotation of planetary gear supporting member 38 in conjunction with solar gear 48. One rotation of planetary gear supporting member 38, i.e., one revolution of planetary gears 49 and 50 around the axis 35, causes two rotations of planetary gears 49 and 50 and head portions 51, 52. Disk-like head portions 51 and 52 have respective pins 53 and 54 projecting away from planetary gears 49 and 50.

Pins 53 and 54 pivotally support one end of link members 55 and 56, respectively. The other ends of link members 55 and 56 are also pivotally supported by pins 57 and 58 projecting generally toward disk-like portions 51 and 52 from a diametric arm 59 secured to an inner flange 29b of cylindrical member 29a. The arm 59 has a center opening 59a through which the stationary axis 35 passes freely.

Figure 5:
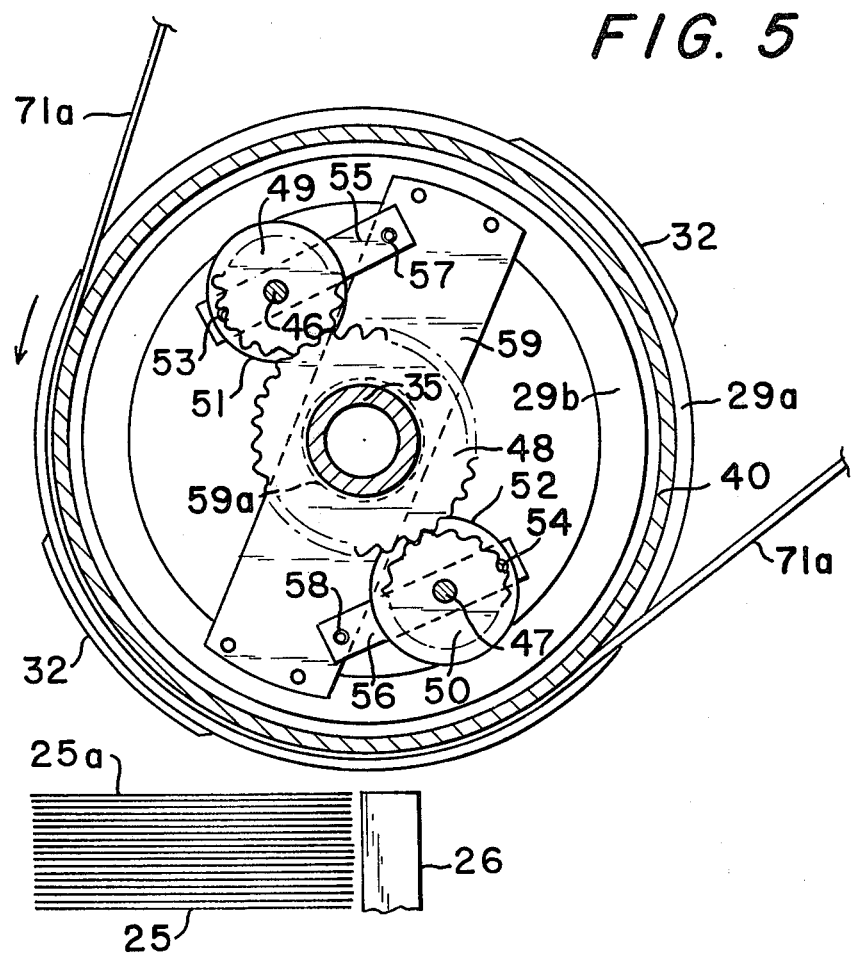
FIG. 5 shows a schematic cross-sectional view of the suction drum of FIG. 2, taken along line C—C thereof.

Accordingly, as the planetary gear support member 38 is rotated counterclockwise by the belt 79, the pins 46, 47 are revolved counterclockwise, as in FIG. 5, around the stationary axis 35. The disks 51, 52 are thereby rotated counterclockwise by the interaction of the planetary gears 49, 50 with the stationary solar gear 48. The links 55, 56, each pivoted at one end, respectively, to the disks 51, 52 and at the other end to opposite ends of the diametric arm 59, rotate the arm and thereby the cylindrical member 29a.

As the pins 53, 54 rotate around the pins 46, 47, the links 55, 56 also pivot about the pins 57, 58 and reciprocate between outer and inner positions with respect to the solar gear 48. As is well-known as to planetary gears, the links 55, 56 are thus reciprocated in a cyclic rhythm between momentary stops when the pins 53, 54 are at their innermost position with acceleration and then deceleration between stops.

This cylindrical member 29a rotates in cyclic manner by means of combination of sun-and-planetary gears and links. Further, cylindrical member 29a repeats two cycles of start-acceleration-deceleration-stop movement during one rotation.

It should be noted that the arrangement of sun-and-planetary-gears, links and diametric arm is adjusted such that the leading edge of the apertured curved zone 30a of the cylindrical member 29a is aligned substantially above the leading edge of the stack 25 at a time when the cylindrical member 29a stops momentarily. The leading edge of the topmost sheet 25a on the stack 25 is therefore lifted off the stack and out from behind the surface 21a by the suction through the suction chamber 33 while the cylindrical member 29a is momentarily stopped.

Before beginning description of the belt conveyor system, the belt pulleys provided on opposite sides of the cylindrical member 29a will be explained. As shown in FIG. 3, stationary drum 34 has an axially extending portion 60 at the edge of its curved surface. A pulley 62 of smaller diameter than that of cylindrical member 29a is mounted, rotatably and coaxially with cylindrical member 29a, on portion 60 of the drum 34 through journals 61. Flange portion 29b of the cylindrical member 29a has a shoulder-like portion on which a pulley 64 of the same diameter as that of pulley 62 is mounted rotatably and coaxially with cylindrical member 29a, by means of journals 63. Pulley 64, therefore, rotates independently of cylindrical member 29a.

As is understood from FIG. 3, the distance between the outer sides of pulleys 62 and 64 is smaller than the width of the cards. The outermost peripheral portion of the cylindrical member 29a faces the widthwise middle portion of the top-positioned card 25a.

Referring again to FIG. 1, the belt conveyor system will now be described. The system comprises upper and lower conveyor devices, generally indicated at 71 and 72. Each of these conveyor devices 71 and 72 has a pair of flat endless belts travelling in parallel. The cylindrical member 29a is disposed between one end-turn portion of paired belts 71a of conveyor device 71. Pulleys 62 and 64 function as end-turn pulleys for conveyor device 71. Belts 71a of conveyor device 71 run along a loop guided by pulley devices 62–64, 74b, 74a, 73d, 73a, 73e, 73b, and 73c. Belts 72a of conveyor device 72 run along the loop guided by pulley devices 74b, 74a, 74e, 74f, 74d, and 74c.

Between pulleys 74b and 74a, the belts 71a, 71b are contiguous and form a conveyor path for the sheets picked off as described hereinafter. Pulleys 73a and 74f are tensioning pulleys, as known in the art, and pulleys 73a and 74e are drive pulleys.

The belt conveyor devices 71, 72 may be driven by any convenient means such as motor M actuating a power train of belts and pulleys, shown in shadow lines in FIG. 1. The power train may also drive the belt 79 for rotating the sleeve member 38 and the planetary gear system.

Preferably, the motor M drives a belt 78 interconnecting drive pulley 75 and driven pulley 76. Pulley 76 has a power take-off surface 76a for driving belt 79 and a power take-off surface 76b interconnected by belt 80 to an intermediate pulley 77. Pulley 77 has a power input surface 77b driven by belt 80 and a power output surface 77a interconnected by belt 81 to drive pulley 74e of the conveyor device 72. Drive pulley 74e is interconnected by belt 82 to drive pulley 73a of conveyor device 71. Drive pulleys 74e and 73a are the same diameter for driving the belts 71a, 72a at the same speed.

As shown in FIG. 4, space S defined by belts 71a and 72a in cooperation with pulleys 74c and 74b, and pulleys 74c and 74b forms an entrance area to which sheets picked from the stack 25 are fed successively. The leading edge of the sheet is carried by the cylindrical member 29a within space S and gradually sandwiched at its widthwise opposed edge portions by belts 71a and 72a to become held by the belt conveyor system. Thus upper and lower belt conveyor devices 71 and 72 form an entrance passage which gradually gets narrow in the transport direction.

After the card is held at its widthwise opposed edge portions between the belts 71a and 72a in mutual contact relationship, the card is conveyed horizontally in the transport direction toward pulley device 74a. An information reading or writing device (not shown) may be provided to read the information during the time the cards are successively conveyed along the transport passage.

Finally, the cards are ejected successively from the belt conveyor system at a separation region of the upper and lower conveyor devices 71 and 72 toward the collecting device 83.

Figure 7:
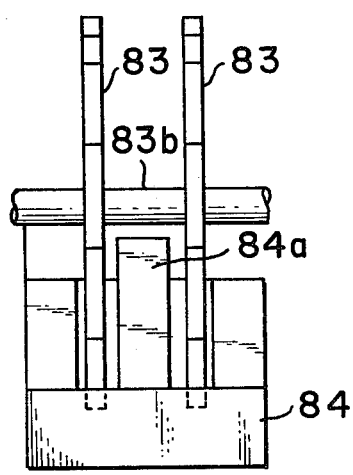
FIG. 7 shows a schematic end view of the collecting device of the embodiment of FIG. 1.

Collecting device 83 will now be explained in conjunction with FIGS. 1 and 7. The collecting device comprises a pair of wheel-like members 83 and a stack box 84. The members 83 are secured to a rotatable shaft 83b, spaced apart, and have substantially the same configuration.

Each of the wheel-like members 83 is fabricated from a solid disk into which is formed or cut a plurality of arcuate slots 83c. Between the slots are thus formed a plurality of curved blades 83a which may be beveled at their outer ends for facilitating the entry of the sheets as they are ejected from the conveyor.

To facilitate the proper ejection of the sheets from the conveyor belts 71a, 72a, the pulley 73d in device 71 is positioned to flex the belts 71a in the direction of the collecting disk 83. The deflection of the movement of the sheets out of the chute between the belts 71a, 72a thus deflects the sheets into the slots 83c.

The slots 83c are curved and coordinated with the direction of movement of the sheets out of the chute so that the sheets are effectively ejected into the slots. Although the disks 83 are rotated counterclockwise as seen in FIG. 1, i.e., falling away from the direction of movement of the sheets, the width of the slots of 83c, and the relative speeds of the movement of the belts and the rotation of the disks are adjusted such that the sheets are ejected into the bottom of the slots 83c.

Stack box 84 has a disengagement plate 84a extending between the members 83 approximately radially from one side of the stack box 84 so as to abut the leading edges of sheets held by the members 83 as they rotate counterclockwise as shown in FIG. 1. Thus, disengagement plate 84a disengages the cards from the disks 83 to drop them down into the box 84. Accordingly, sheets, such as the cards, are re-stacked in upside-down relation with respect to the stack 25. The collection wheels 83 may be rotated by any suitable means, such as a belt (not shown) driven by the motor M.

In operation, the suction drum 29 stops momentarily about when the leading end of one of the apertured curved zones of the cylindrical member 29a crosses a plane defined by the surface 21a, against which the sheets in the stack 25 abut, as previously explained. When the member 29a is stopped, the leading edge of the apertured zone 30a will overlap the suction chamber 33 by around 3 mm to 8 mm due to the fixed relationship of the suction chamber 33 and the stack 25. Thus, the suction operation by the drum 29 begins at a time slightly before the member 29a stops.

Since a small portion of the apertured curved zone 30a overlaps the opening of the chamber 33, when the member 29a stops momentarily, the drum 29 functions to give a relatively strong suction force to the top-positioned sheet 25a. The leading edge portion of the top-positioned card 25a is pulled up stably and comes into contact with the relatively high frictional surface of the covering 32. It will be understood, that the above operation can be modified so that cylindrical member 29a does not come to a complete stop but rather goes through a cyclic sequence of acceleration-deceleration.

There is a possibility that the attracted top-positioned card 25a will be accompanied by one or more underlying additional sheets. The separation suction device 26 applies vacuum to such additional sheets, if any, and stops movement thereof, as shown in FIG. 4. For example, a next to the top-positioned sheet is captured by the first row of apertures 27 in the head of the suction device 26 aligned perpendicularly to the transport direction, a second sheet by the middle row of apertures, and a third card by the third row of apertures in the directional movement of the sheets. Regular distribution of the apertures 27 in a matrix, such as shown in FIG. 6, is preferable for stopping the undesireable movement of any additional sheets, particularly for stopping the movement underlying sheets in regularly staggered relation, as shown in FIG. 4. The top-positioned sheet is then in the best position for being picked off at the next rotation of an apertured zone 30a. It is apparent that the suction force by the suction drum 20 is required to be larger than that of the separation suction chamber 26. Thus, any underlying sheets are reliably separated from the top-positioned card and stopped within a relatively small movement thereof in the transport direction. At the same time, the top-positioned sheet 25a is moved stably with the periphery of the cylindrical member 29a. This arrangement also contributes to equalization of distance between the leading edges of successive sheets during conveying in the conveyor system.

Further, this arrangement eliminates any operation of additional pushing back movement of underlying sheets with its probability of jams or wrinkles in the sheets.

According to this invention, the sheet picking and separating operation is performed during relatively slow rotational movement, including a momentary stop, of the cylindrical member 29a. Hence, such picking and separating operation is performed reliably. The leading edge portion of the top-positioned sheet 25a can be reliably picked up approximately at the momentary stop of the cylindrical member 29a, because the suction operation begins slightly before the member 29a stops although the suction operation has a short characteristic delay in response. This makes it possible that distance between the leading edges of adjacent sheets in transportation is approximately equal and also that occurrence of dog-ears in leading corners of the sheets is effectively prevented.

After the picking and separating operation, the picked up sheet moves further in acceleration with the cylindrical member 29a. The apertures 30 newly overlapping the opening of the chamber 33 suck up trailing portion of the picked card. The vacuum force on the leading edge portion of the picked sheets ceases after such leading edge portion passes by the termination of the opening defined by the rib 33b of the suction chamber. At this time, the leading edge portion of the picked sheet begins to separate from the cylindrical drum 29a in conjunction with conveyor function by the belts 71a. Thus the leading edge portion of the picked sheet or card moves in acceleration to be inserted between the belts 71a and 72a while the trailing portion of the picked sheet such as a data card, is still attracted by the suction drum 29.

It should be noted that the suction operation on the sheet continues until the moment just before the leading edge portion of the picked sheet is held firmly by the interaction of the belts 71a and 72a.

The necessary condition to transfer the sheet from the cylindrical member 29a to the conveying belts 71a and 72a is as follows:

$$D_1 \simeq D_2 < L_c$$

wherein $D_1$ denotes a distance between a point at which the belts 71a and 72a mutually contact and a point at which a point on the belt 72a crosses a plane defined by the inner surface of the rib 33b, i.e., the forward end of the suction chamber 33, $D_2$ denotes the peripheral length along the apertured curved surface of the cylindrical member 29a, i.e., a zone 30a, and $L_c$ denotes a length of a sheet from the stack 25 in the transport direction.

The card in transient state, further, moves in the transport direction, and becomes free from the suction drum 29 when and after the trailing end of the apertured curved zone 30a of the cylindrical member 29a passes by the termination of the opening of the chamber 33 which is defined by the inner surface of rib 33b. Because the suction operation ceases after such time, then the sheet is held only by the belt conveyor systems and is conveyed in the transport direction toward the collection device 83.

It should be noted that the travelling speed of the belts 71a and 72a is almost the same as that of peripheral speed of the cylindrical member 29a at a time when the suction operation of the drum 29 terminates. This is easily attained, for example, by varying the diameter of the cylindrical member 29a when designing.

Accordingly, as the belts 71a and 72a approach each other they initially make frictional contact with the sheet, thereby flattening the sheet preventing the occurrence of dog-ear and/or jam or wrinkle of the sheet. The belts 71a and 72b then become contiguous thereby grasping the leading edge of the sheet. Thereafter the belts 71a and 72a follow the same path carrying the sheet in the transport direction.

Athough described above is a certain preferred embodiment, there may be many modifications or changes within the scope of the appended claims or within the spirit of this invention. For example, the apertured curved portion 30a of the cylindrical member 29a may include a single zone or three zones. If a single zone, ratio of the diameter of the solar gear with respect to the planetary gears will be 1 (one). If three zones, such ratio will be 3. And, a motor controlled positioning device may be employed as for keeping the top-positioned sheet of the stack, against the stop bar 22 instead of the biasing spring.

What is claimed is:

1. A sheet transport apparatus comprising:
   means for maintaining a stack of sheets with the topmost sheet of said stack at a predetermined position;
   suction drum means supported adjacent said topmost sheet of said stack with a clearance therebetween at the leading edge portion of said topmost sheet for picking up said topmost sheet in the transport direction, said drum means comprising a rotatable cylindrical member with an elongated apertured zone in its curved surface, the peripheral length of said apertured zone being less than the length of said sheets; a stationary suction chamber positioned within said cylindrical member and extending along the inner surface of said cylindrical member, said stationary suction chamber having an opening which opens adjacent to the inner surface of said cylindrical member for picking up said topmost sheet of said stack when the leading end of said apertured zone of said cylindrical member passes by said opening of said suction chamber; and means for rotating said cylindrical member in a manner that the periphery of said cylindrical member facing to the leading edge portion of said topmost sheet moves in the transport direction, said rotating means rotating said cylindrical member in a cyclic operation of acceleration-deceleration and in such a relation that said leading end of said apertured zone of said cylindrical member is substantially aligned with the leading edge of said topmost sheet of said stack when said cylindrical member reaches the minimum speed in its cyclic operation; and
   means for conveying said picked-up topmost sheet away from said suction drum means, said conveying means comprising a pair of constant speed belt conveyor devices defining first and second conveying paths and an entrance area therebetween in such a manner that the conveying belts gradually approach each other in the transport direction initially making frictional contact with the leading edge of a sheet picked up and fed by said suction drum means while the traveling speed of said belt conveyor devices exceeds the peripheral speed of said cylindrical member and while the trailing portion of the sheet is still under suction by the suction drum means whereby said sheet is flattened and then becomes contiguous with said belts, and thereafter said conveying belts grasping the leading edge of said picked-up sheet, said second conveying path and said first conveying path thereafter being the same while the conveying belts travel contiguously in the transport direction;

the maximum peripheral speed of said cylindrical member being selected nearly equal to the travelling speed of said conveying belts; and said sheet being grasped at the leading edge between said conveying belts and released from said suction drum when the peripheral speed of said cylindrical member reaches the maximum speed.

2. The sheet transport apparatus according to claim 1 wherein, said cylindrical member is disposed between one end-turn portion of said paired belts of said conveyor devices.

3. The sheet transport apparatus according to claim 1 wherein, said rotating means includes a planetary gear system for cyclically driving said cylindrical member, and said planetary gear system is rotatably and coaxially mounted on said stationary suction chamber.

4. The sheet transport apparatus according to claim 1, wherein, each of said belt conveying devices comprises a pair of endless belts travelling in parallel during a part of their respective first and second conveying paths.

5. The sheet transport apparatus of claim 1 also including stationary separation suction means disposed adjacent to said stack in the transport direction, said stationary separation suction means including a surface substantially coplanar with said topmost sheet and having a plurality of rows of apertures through which air is sucked for separating any sheet or sheets underlying the topmost sheet undesirably picked-up by the operation of picking said topmost sheet from said stack.

6. The sheet transport apparatus according to claim 5 wherein, said apertures of said stationary separation suction means are arranged to form three rows perpendicular to the transport direction.

7. The sheet transport apparatus according to claim 1 wherein said opening of said suction chamber within said cylindrical member has a termination extending axially across the rearward end of the chamber in the direction of rotation of said cylindrical member and wherein the leading end of said apertured zone progresses to a distance slightly beyond said termination before said cylindrical member reaches minimum speed in its cyclical operation, whereby suction applied to the leading edge of said topmost sheet begins during deceleration of said cylindrical member.

8. The sheet transport apparatus according to claim 7 wherein said distance the leading end of said apertured zone progresses beyond said termination before said cylindrical member reaches minimum speed is about 3 to 8 mm in the circumference of said cylindrical member.

* * * * *